United States Patent
Gao et al.

(10) Patent No.: US 9,420,547 B2
(45) Date of Patent: Aug. 16, 2016

(54) METHOD AND APPARATUS FOR SETTING WORKING MODE OF PA BLANKING

(71) Applicant: Huawei Device Co., Ltd., Shenzhen (CN)

(72) Inventors: Shan Gao, Shenzhen (CN); Tongbo Wang, Shanghai (CN); Wenfeng Yao, Shenzhen (CN); Junjun Zhu, Suzhou (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/948,560

(22) Filed: Nov. 23, 2015

(65) Prior Publication Data

US 2016/0081037 A1    Mar. 17, 2016

Related U.S. Application Data

(63) Continuation of application No. PCT/CN2014/078421, filed on May 26, 2014.

(30) Foreign Application Priority Data

May 27, 2013  (CN) .......................... 2013 1 0201948

(51) Int. Cl.
| | |
|---|---|
| *H04B 7/00* | (2006.01) |
| *H04W 52/24* | (2009.01) |
| *H04W 64/00* | (2009.01) |
| *H04B 1/3805* | (2015.01) |
| *H04B 1/525* | (2015.01) |
| *H04W 52/28* | (2009.01) |

(52) U.S. Cl.
CPC ........... *H04W 52/241* (2013.01); *H04B 1/3805* (2013.01); *H04B 1/525* (2013.01); *H04W 52/28* (2013.01); *H04W 64/00* (2013.01)

(58) Field of Classification Search
USPC ......................................................... 455/522
See application file for complete search history.

(56) References Cited

U.S. PATENT DOCUMENTS

| | | | |
|---|---|---|---|
| 2005/0078031 A1* | 4/2005 | Park ......................... | G01S 19/36 342/357.63 |
| 2007/0008215 A1* | 1/2007 | Smith ...................... | G01S 19/21 342/357.29 |
| 2010/0119020 A1* | 5/2010 | Bhukania ................ | H04L 27/08 375/345 |

FOREIGN PATENT DOCUMENTS

| | | |
|---|---|---|
| CN | 1606243 A | 4/2005 |
| CN | 101228458 A | 7/2008 |
| CN | 101516129 A | 8/2009 |

OTHER PUBLICATIONS

Foreign Communication From a Counterpart Application, PCT Application No. PCT/CN2014/078421, English Translation of International Search Report dated Aug. 19, 2014, 2 pages.
Foreign Communication From a Counterpart Application, PCT Application No. PCT/CN2014/078421, English Translation of Written Opinion dated Aug. 19, 2014, 5 pages.

* cited by examiner

*Primary Examiner* — Ankur Jain
(74) *Attorney, Agent, or Firm* — Conley Rose, P.C.; Grant Rodolph; Adam J. Stegge

(57) ABSTRACT

A method and an apparatus for setting a working mode of power amplifier (PA) blanking are disclosed, which resolve a problem that, in the prior art, when a Global System for Mobile Communications (GSM) is working, because a PA blanking function cannot be configured flexibly to an enabled state or a disabled state, quality of a Global Positioning System (GPS) receiving signal is degraded. When a GPS is running, it is detected, at a preset interval, whether a GSM service is running. When the GSM service is running, a current quantity of timeslots occupied by the GSM service and a current power control level used by the GSM service are acquired.

8 Claims, 3 Drawing Sheets

METHOD AND APPARATUS FOR SETTING WORKING MODE OF PA BLANKING

CROSS-REFERENCE TO RELATED APPLICATIONS

This application is a continuation of International Application No. PCT/CN2014/078421, filed on May 26, 2014, which claims priority to Chinese Patent Application No. 201310201948.9, filed on May 27, 2013, both of which are hereby incorporated by reference in their entireties.

TECHNICAL FIELD

The present disclosure relates to the field of communications technologies, and in particular, to a method and an apparatus for setting a working mode of power amplifier (PA) blanking.

BACKGROUND

In an existing mobile phone, when a Global System for Mobile Communications (GSM) and a Global Positioning System (GPS) exist simultaneously, when a PA of the GSM transmits a signal, generated spurious emission affects a GPS receiving signal, where a carrier-to-noise-density ratio (CN0) value is used to indicate signal strength of the GPS receiving signal, and an amount of deterioration of the CN0 value is used to measure quality of a GPS receiver receiving signal, that is, a larger amount of deterioration of the CN0 value indicates worse quality of the GPS receiver receiving signal.

Therefore, each GPS chip manufacturer sets a PA blanking function on a GPS chip. When a mobile phone manufacturer enables the PA blanking function, the amount of deterioration of the CN0 value of the GPS is controlled within a range. However, when the GSM is working, a power control level (PCL) of the mobile phone and a quantity of slots (timeslots) both change. Therefore, when the PCL and a value of the quantity of slots are constant, the amount of deterioration of the CN0 value of the GPS when the PA blanking function is enabled may be greater than an amount of deterioration of the CN0 value of the GPS when the PA blanking function is disabled. Therefore, because the PA blanking function cannot be configured flexibly to an enabled state or a disabled state, the amount of deterioration of the CN0 value of the GPS increases, resulting in degradation of the quality of the GPS receiving signal.

SUMMARY

Embodiments of the present disclosure provide a method and an apparatus for setting a working mode of PA blanking, so as to improve quality of a GPS receiving signal.

To achieve the foregoing objective, the following technical solutions are used in the embodiments of the present disclosure.

According to a first aspect, the present disclosure provides a method for setting a working mode of PA blanking, including, when a GPS is running, detecting, at a preset interval, whether a GSM service is running; when it is detected that the GSM service is running, acquiring a current quantity of timeslots occupied by the GSM service and a current power control level used by the GSM service; searching, according to the current quantity of timeslots and the current power control level, a preset table for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state; determining whether the indication information is consistent with a current working mode of the PA blanking; and setting, when it is determined that the indication information is not consistent with the current working mode of the PA blanking, the current working mode of the PA blanking to a working mode corresponding to the indication information.

In a first possible implementation manner of the first aspect, the detecting, at a preset interval, whether a GSM service is running includes detecting, at the preset interval, whether a state value of the GSM service is a working state value.

With reference to the first aspect or the first possible implementation manner of the first aspect, in a second implementation manner of the first aspect, the method further includes, when it is detected that the GSM service is not running, detecting the current working mode of the PA blanking; and when it is detected that the current working mode of the PA blanking is in the enabled state, disabling the PA blanking.

With reference to the second possible implementation manner of the first aspect, in a third implementation manner of the first aspect, the setting, when the indication information is not consistent with the current working mode of the PA blanking, the current working mode of the PA blanking to a working mode corresponding to the indication information includes, when the indication information indicates that the working mode of the PA blanking is in the enabled state and the current working mode of the PA blanking is in the disabled state, enabling the PA blanking; or when the indication information indicates that the working mode of the PA blanking is in the disabled state and the current working mode of the PA blanking is in the enabled state, disabling the PA blanking.

With reference to the second possible implementation manner of the first aspect, in a fourth implementation manner of the first aspect, the method further includes, when it is determined that the indication information is consistent with the current working mode of the PA blanking, performing no processing on the current working mode of the PA blanking.

According to a second aspect, the present disclosure provides an apparatus for setting a working mode of PA blanking, including a detecting unit configured to, when a GPS is running, detect, at a preset interval, whether a GSM service is running; an acquiring unit configured to, when the detecting unit detects that the GSM service is running, acquire a current quantity of timeslots occupied by the GSM service and a current power control level used by the GSM service; a searching unit configured to search, according to the current quantity of timeslots and the current power control level that are acquired by the acquiring unit, a preset table for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state; a determining unit configured to determine whether the indication information found by the searching unit is consistent with a current working mode of the PA blanking; and a processing unit configured to set, when the determining unit determines that the indication information is not consistent with the current working mode of the PA blanking, the current working mode of the PA blanking to a working mode corresponding to the indication information.

In a first possible implementation manner of the second aspect, the detecting unit is configured to detect, at the preset interval, whether a state value of the GSM service is a working state value.

With reference to the second aspect or the first possible implementation manner of the second aspect, in a second implementation manner of the second aspect, the detecting unit is further configured to, when it is detected that the GSM service is not running, detect the current working mode of the PA blanking; and the processing unit is further configured to, when the detecting unit detects that the current working mode of the PA blanking is in the enabled state, disable the PA blanking.

With reference to the second possible implementation manner of the second aspect, in a third implementation manner of the second aspect, the processing unit includes a first processing module configured to, when the indication information indicates that the working mode of the PA blanking is in the enabled state and the current working mode of the PA blanking is in the disabled state, enable the PA blanking; and a second processing module configured to, when the indication information indicates that the working mode of the PA blanking is in the disabled state and the current working mode of the PA blanking is in the enabled state, disable the PA blanking.

With reference to the second possible implementation manner of the second aspect, in a fourth implementation manner of the second aspect, the processing unit is further configured to, when the determining unit determines that the indication information is consistent with the current working mode of the PA blanking, perform no processing on the current working mode of the PA blanking.

The embodiments of the present disclosure provide a method and an apparatus for setting a working mode of PA blanking. When a GPS is running, it is detected, at a preset interval, whether a GSM service is running. When it is detected that the GSM service is running, a current quantity of timeslots occupied by the GSM service and a current power control level used by the GSM service are acquired. Then, a preset table is searched, according to the current quantity of timeslots and the current power control level, for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state. It is determined whether the indication information is consistent with the current working mode of the PA blanking. The current working mode of the PA blanking is set, when the indication information is not consistent with the current working mode of the PA blanking, to a working mode corresponding to the indication information, such that when a GSM is working, impact on quality of a GPS receiving signal is minimum and an amount of deterioration of a CN0 value of the current GPS is relatively minimum. The embodiments of the present disclosure resolve a problem that, in the prior art, when a GSM is working, a PCL of a mobile phone and a quantity of slots both change, and because a PA blanking function cannot be configured flexibly to an enabled state or a disabled state, an amount of deterioration of a CN0 value of a GPS increases, and quality of a GPS receiving signal is degraded.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
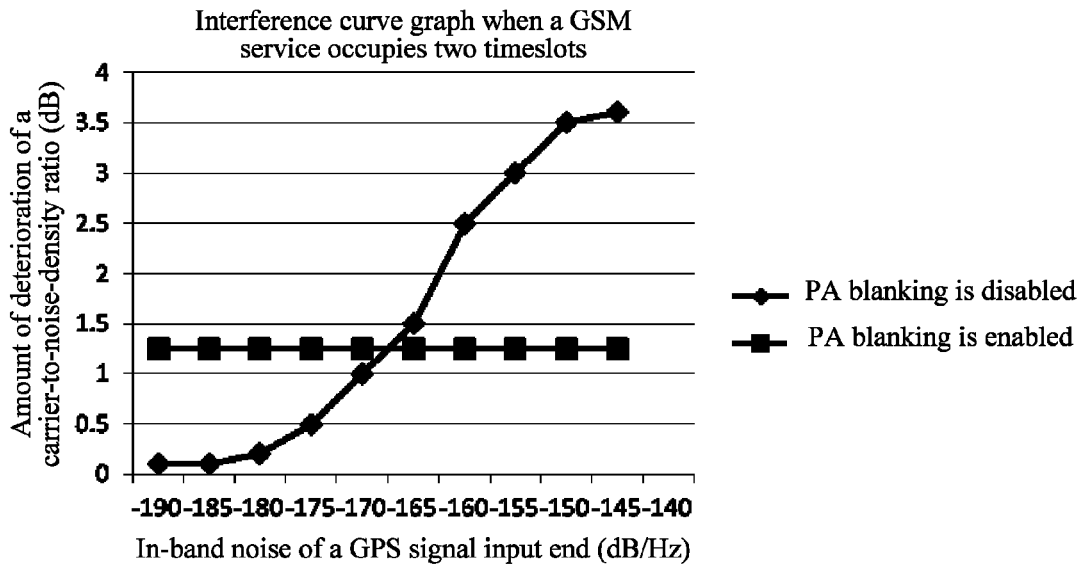
FIG. 1 is an interference line graph when a GSM service occupies two timeslots.

Before this embodiment of the present disclosure is implemented, it may be seen from FIG. 1 that, after PA blanking is enabled, when a quantity of timeslots occupied when a GSM performs transmission is fixed to 2, regardless of a value of a power control level used by the GSM, an amount of deterioration of a CN0 value of a GPS is a constant value, that is, a straight line in FIG. 1. If the PA blanking is disabled, when isolation between a GSM antenna and a GPS antenna is constant and the quantity of timeslots occupied when the GSM performs transmission is fixed to 2, as the power control level used by the GSM increases, a GSM signal falls into a GPS signal band, causing that noise within the GPS signal band also gradually increases, and further, the amount of deterioration of the CN0 value of the GPS also tends to gradually increase from low to high, that is, an upward curve ascending from low to high in FIG. 1. In FIG. 1, before the straight line and the curve are intersected, it may be known that the amount of deterioration of the CN0 value of the GPS can be decreased by disabling the PA blanking, and after the straight line and the curve are intersected in FIG. 1, the amount of deterioration of the CN0 value of the GPS can be controlled to a fixed value by enabling the PA blanking. Therefore, the amount of deterioration of the CN0 value of the GPS can be decreased by flexibly controlling enabling or disabling of the PA blanking, thereby improving quality of a GPS receiving signal.

Therefore, before this embodiment of the present disclosure is implemented, different power control levels and quantities of timeslots are used as variables to build a two-dimensional preset table $a_m*b_m$ where $a_1 \ldots a_i \ldots a_m$ indicate m different power control levels, and $a_i$ indicates any one of the m different power control levels; and $b_1 \ldots b_j \ldots b_n$ indicate n different quantities of timeslots, and $b_j$ indicates any one of the n different quantities of timeslots. A value corresponding to $(a_i, b_j)$ in the preset table is indication information of a working mode of the PA blanking, and a value of the indication information may be 1 or 0, where the value of $(a_i, b_j)$ is determined by a difference between an amount of deterioration of the CN0 value of the GPS when the PA blanking is disabled and an amount of deterioration of the CN0 value of the GPS when the PA blanking is enabled, and when the difference is a positive number, the value of the indication information is set to 1, indicating that the amount of deterioration of the CN0 value of the GPS when the PA blanking is disabled is greater than the amount of deterioration of the CN0 value of the GPS when the PA blanking is enabled, such that when the indication information is 1, the PA blanking should be enabled. When the difference is a negative number, the value of the indication information is set to 0, indicating that the amount of deterioration of the CN0 value of the GPS when the PA blanking is disabled is less than the amount of deterioration of the CN0 value of the GPS when the PA blanking is enabled, such that when the indication information is 0, the PA blanking should be disabled. Settings of the indication information in the preset table are not limited to the foregoing values, as long as the value can indicate whether the PA blanking is enabled or disabled.

Figure 2:
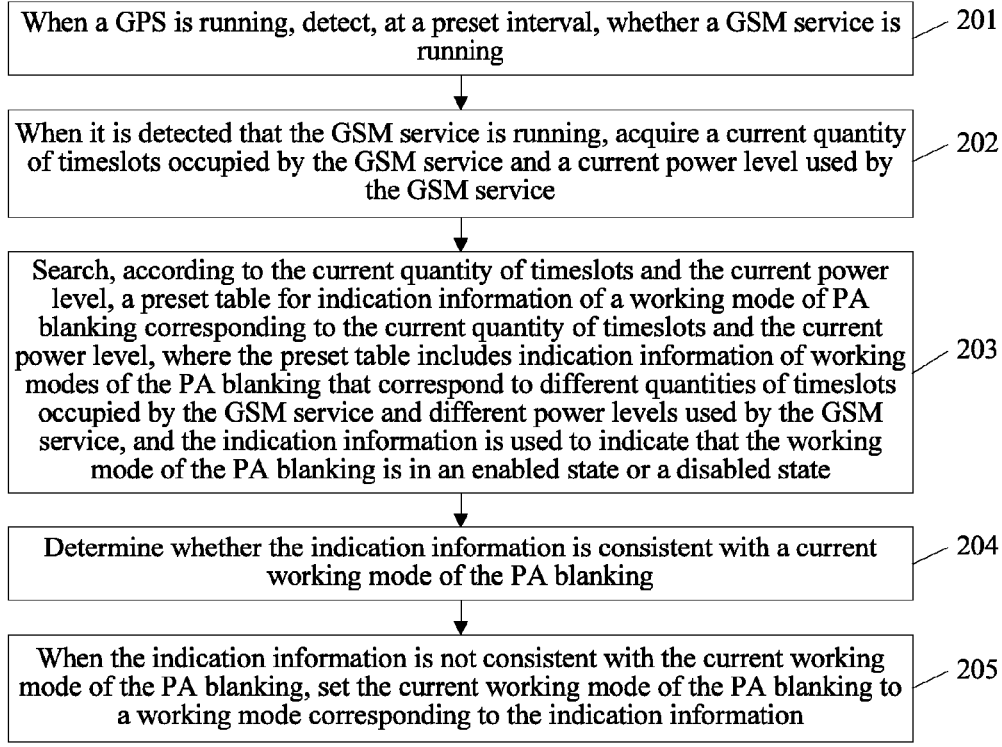
FIG. 2 is a flowchart of a method for setting a working mode of PA blanking according to Embodiment 1 of the present disclosure.

As shown in FIG. 2, this embodiment of the present disclosure provides a method for setting a working mode of PA blanking. An execution body is a terminal such as a mobile phone or a pad, and the method includes the following steps.

201: When a GPS is running, detect, at a preset interval, whether a GSM service is running.

After a user enables a GPS of the terminal, the terminal detects, at the preset interval, for example, an interval of 1 second (s), whether a GSM service of the terminal is running. The GSM service includes a voice service or a data service.

Detecting whether the GSM service is running is detecting a state value of the GSM service. When the GSM service is running, the state value is set to a working state value, for example, 1, and when the GSM service is not running, the state value is 0.

202: When it is detected that the GSM service is running, acquire a current quantity of timeslots occupied by the GSM service and a current power control level used by the GSM service.

It may be known from step 201 that, when it is detected that the state value of the GSM service is 1, it indicates that the GSM service is running, and then the current quantity of timeslots occupied and the current power control level used when the GSM service is currently running are acquired.

The current power control level may be found by the terminal according to strength of a signal received from a base station and a mapping relationship table built in advance. The mapping relationship table is a table of correspondences between different signal strength and transmit power, and in addition, the transmit power corresponds to the power control level; therefore, corresponding transmit power can be found according to the strength of the signal received from the base station, and then the current power control level is acquired. In addition, because the terminal can support transmission using multiple timeslots, when the terminal performs data exchange with the base station, the base station allocates the quantity of timeslots to the terminal, and the terminal may acquire a quantity of currently occupied timeslots. For a specific acquiring manner, reference may be made to related content in the prior art.

203: Search, according to the current quantity of timeslots and the current power control level, a preset table for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state.

According to a two-dimensional preset table built before this embodiment of the present disclosure is implemented, the preset table is searched, using the acquired current quantity of timeslots and the acquired current power control level, for the indication information of the working mode of the PA blanking corresponding to the current quantity of timeslots and the current power control level.

204: Determine whether the indication information is consistent with a current working mode of the PA blanking.

It is determined whether the acquired indication information indicating that the working mode of the PA blanking is in an enabled state or a disabled state is consistent with the current working mode of the PA blanking.

205: Set, when the indication information is not consistent with the current working mode of the PA blanking, the current working mode of the PA blanking to a working mode corresponding to the indication information.

This embodiment of the present disclosure provides a method for setting a working mode of PA blanking. When a GPS is running, it is detected, at a preset interval, whether a GSM service is running. When it is detected that the GSM service is running, a current quantity of timeslots occupied by the GSM service and a current power control level used by the GSM service are acquired. Then, a preset table is searched, according to the current quantity of timeslots and the current power control level, for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state. It is determined whether the indication information is consistent with the current working mode of the PA blanking. The current working mode of the PA blanking is set, when the indication information is not consistent with the current working mode of the PA blanking, to a working mode corresponding to the indication information. This embodiment of the present disclosure resolves a problem that, in the prior art, when a GSM is working, a PCL of a mobile phone and a quantity of slots both change, and because a PA blanking function cannot be configured flexibly to an enabled state or a disabled state, an amount of deterioration of a CN0 value of a GPS increases, and quality of a GPS receiving signal is degraded. By using the solution of this embodiment of the present disclosure, the quality of the GPS receiving signal can be improved.

Figure 3:
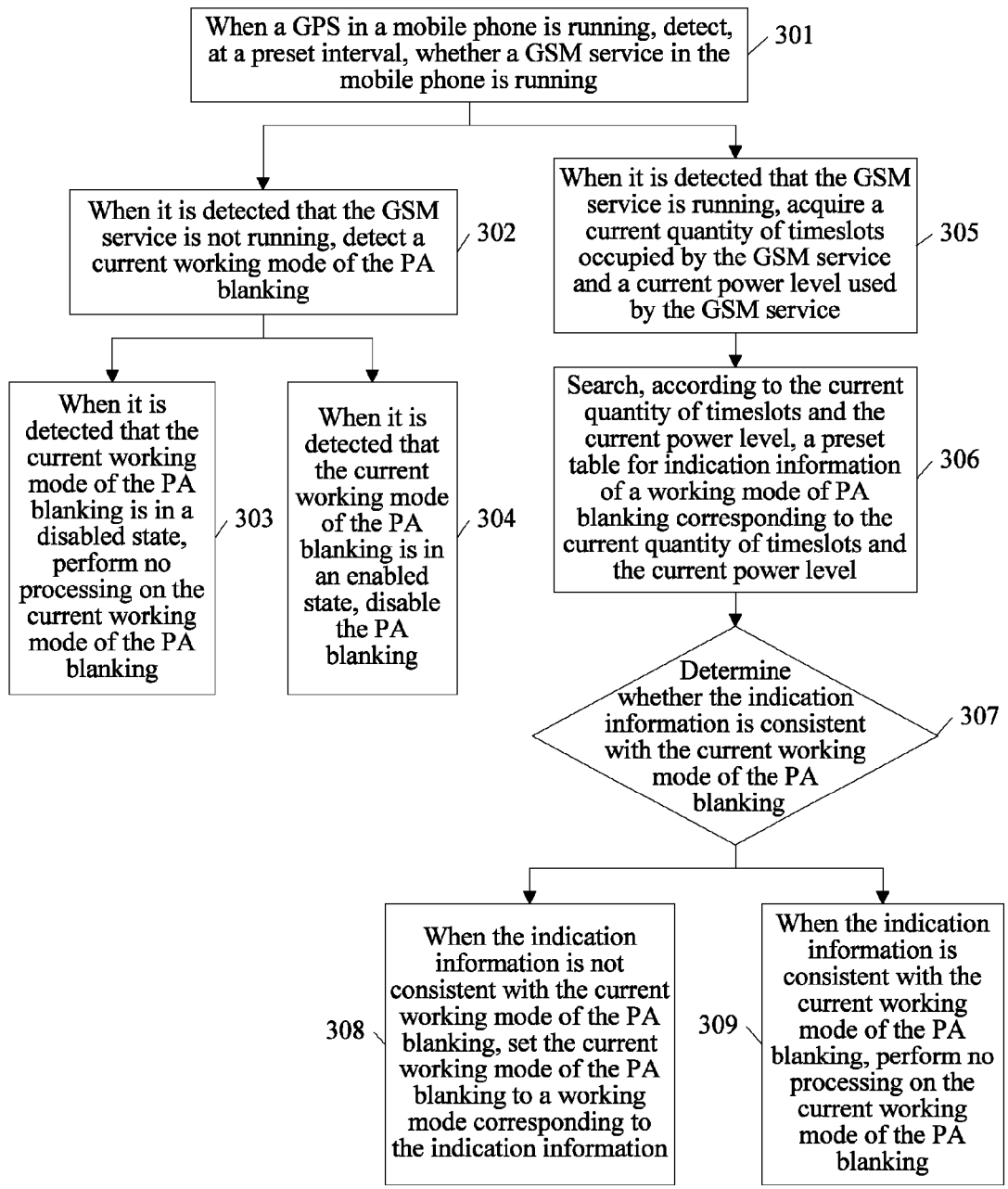
FIG. 3 is a flowchart of another method for setting a working mode of PA blanking according to Embodiment 1 of the present disclosure.

In an implementation manner of this embodiment of the present disclosure, a method for setting a working mode of PA blanking is provided. As shown in FIG. 3, a mobile phone serving as an execution body is used as an example for description, and the method includes the following steps.

301: When a GPS in a mobile phone is running, detect, at a preset interval, whether a GSM service in the mobile phone is running.

When a user of the mobile phone enables the GPS in the mobile phone, the mobile phone detects, at the preset interval, for example, an interval of 1 s, whether the GSM service in the mobile phone is running. The GSM service includes a voice service or a data service.

Detecting whether the GSM service in the mobile phone is running is detecting a state value of the GSM service. When the GSM service is running, the state value is set to a working state value, for example, 1, and when the GSM service is not running, the state value is 0.

302: When it is detected that the GSM service is not running, detect a current working mode of the PA blanking.

When the GSM service in the mobile phone is not running, the GPS is not affected by the GSM service. Therefore, the PA blanking does not need to be enabled and the current working mode of the PA blanking is detected.

303: When it is detected that the current working mode of the PA blanking is in a disabled state, perform no processing on the current working mode of the PA blanking.

304: When it is detected that the current working mode of the PA blanking is in an enabled state, disable the PA blanking.

When the GSM service in the mobile phone is not running, the GPS is not affected by the GSM service. Therefore, the PA blanking does not need to be enabled, and when it is detected that the current working mode of the PA blanking is in the enabled state, the PA blanking is disabled, so as to reduce power consumption.

305: When it is detected that the GSM service is running, acquire a current quantity of timeslots occupied by the GSM service and a current power control level used by the GSM service.

It may be known from step 301 that, when it is detected that the state value of the GSM service is 1, it indicates that the GSM service is running, and then the current quantity of timeslots occupied and the current power control level used when the GSM service is currently running are acquired.

306: Search, according to the current quantity of timeslots and the current power control level, a preset table for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state.

According to a two-dimensional preset table built before this embodiment of the present disclosure is implemented, the preset table is searched, using the acquired current quantity of timeslots and the acquired current power control level, for the indication information of the working mode of the PA blanking corresponding to the current quantity of timeslots and the current power control level.

307: Determine whether the indication information is consistent with the current working mode of the PA blanking.

It is determined whether the indication information, corresponding to the acquired current quantity of timeslots and the acquired current power control level and indicating that the working mode of the PA blanking is in the enabled state or in the disabled state, in the preset table is consistent with the current working mode of the PA blanking.

308: Set, when the indication information is not consistent with the current working mode of the PA blanking, the current working mode of the PA blanking to a working mode corresponding to the indication information.

When the indication information is not consistent with the current working mode of the PA blanking, the following two cases are included.

First case: when the indication information indicates that the working mode of the PA blanking is in the enabled state and the current working mode of the PA blanking is in the disabled state, the PA blanking is enabled.

For example, if the acquired current quantity of timeslots is 3 and the acquired current power control level is 4, the preset table is searched for the indication information corresponding to (4, 3), which is 1, indicating that the PA blanking should be enabled, while the current working mode of the PA blanking is in the disabled state, such that the PA blanking is enabled.

Second case: when the indication information indicates that the working mode of the PA blanking is in the disabled state and the current working mode of the PA blanking is in the enabled state, the PA blanking is disabled.

For example, if the acquired current quantity of timeslots is 3 and the acquired current power control level is 4, the preset table is searched for the indication information corresponding to (4, 3), which is 0, indicating that the PA blanking should be disabled, while the current working mode of the PA blanking is in the enabled state, such that the PA blanking is disabled.

309: When the indication information is consistent with the current working mode of the PA blanking, perform no processing on the current working mode of the PA blanking.

When the indication information and the current working mode of the PA blanking are both enabled, or when the indication information and the current working mode of the PA blanking are both disabled, no processing is performed on the current working mode of the PA blanking, and the current working mode of the PA blanking remains unchanged.

In this embodiment of the present disclosure, when the GSM service is running, the current quantity of timeslots occupied by the GSM service and the current power control level used by the GSM service are acquired, and then the two-dimensional preset table built in advance using the quantity of timeslots, the power control level, and the working mode of the PA blanking is searched for the indication information corresponding to the current quantity of timeslots and the current power control level, to set the working mode of the PA blanking. A PA blanking function is configured flexibly to an enabled state or a disable state, which improves quality of a GPS receiving signal.

In addition, this embodiment may also be applied to another time division duplex (TDD) system, and a same determining mechanism is added, and an interference status and block resistance performance of a GPS chip are comprehensively analyzed, so when a condition is met, the PA blanking function of the GPS is enabled or disabled.

Embodiment 2

Figure 4:
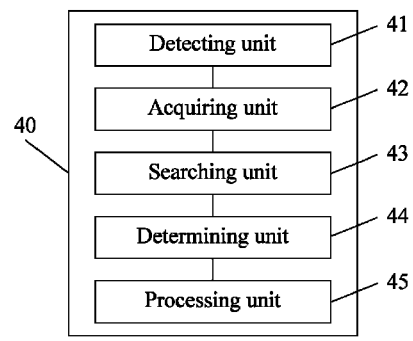
FIG. 4 is a structural diagram of an apparatus for setting a working mode of PA blanking according to Embodiment 2 of the present disclosure.

This embodiment of the present disclosure provides an apparatus 40 for setting a working mode of PA blanking. As shown in FIG. 4, the apparatus 40 includes a detecting unit 41, an acquiring unit 42, a searching unit 43, a determining unit 44, and a processing unit 45.

The detecting unit 41 is configured to, when a GPS is running, detect, at a preset interval, whether a GSM service is running.

The acquiring unit 42 is configured to, when the detecting unit detects that the GSM service is running, acquire a current quantity of timeslots occupied by the GSM service and a current power control level used by the GSM service.

The searching unit 43 is configured to search, according to the current quantity of timeslots and the current power control level that are acquired by the acquiring unit, a preset table for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state.

The determining unit 44 is configured to determine whether the indication information found by the searching unit is consistent with a current working mode of the PA blanking.

The processing unit 45 is configured to set, when the determining unit determines that the indication information is not consistent with the current working mode of the PA blanking, the current working mode of the PA blanking to a working mode corresponding to the indication information.

This embodiment of the present disclosure provides an apparatus for setting a working mode of PA blanking. When a GPS is running, it is detected, at a preset interval, whether a GSM service is running. When it is detected that the GSM service is running, a current quantity of timeslots occupied by the GSM service and a current power control level used by the GSM service are acquired. Then, a preset table is searched, according to the current quantity of timeslots and the current power control level, for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state. It is determined whether the indication information is consistent with the current working mode of the PA blanking. The current working mode of the PA blanking is set, when the indication information is not consistent with the current working mode of the PA blanking, to a working mode corresponding to the indication information. This embodiment of the present disclosure resolves a problem that, in the prior art, when a GSM is working, a PCL of a mobile phone and a quantity of slots both change, and because a PA blanking function cannot be configured flexibly to an enabled state or a disabled state, an amount of deterioration of a CN0 value of a GPS increases, and quality of a GPS receiving signal is degraded.

The apparatus 40 is disposed in a terminal such as a mobile phone or a pad. In an application, optionally, the detecting unit is configured to detect, at the preset interval, whether a state value of the GSM service is a working state value.

Optionally, the detecting unit is further configured to, when it is detected that the GSM service is not running, detect the current working mode of the PA blanking; and the processing unit is further configured to, when the detecting unit detects that the current working mode of the PA blanking is in the enabled state, disable the PA blanking.

Figure 5:
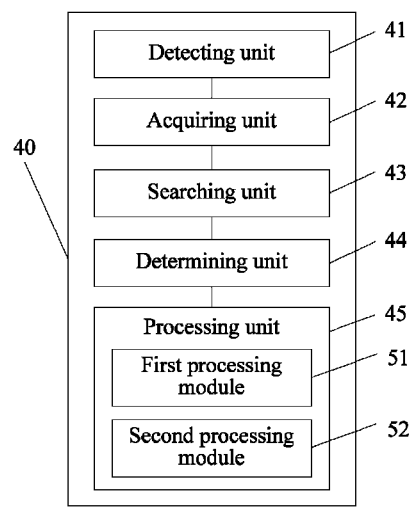
FIG. 5 is a structural diagram of another apparatus for setting a working mode of PA blanking according to Embodiment 2 of the present disclosure.

Optionally, as shown in FIG. 5, the processing unit 45 includes a first processing module 51 configured to, when the indication information indicates that the working mode of the PA blanking is in the enabled state and the current working mode of the PA blanking is in the disabled state, enable the PA blanking; and a second processing module 52 configured to, when the indication information indicates that the working mode of the PA blanking is in the disabled state and the current working mode of the PA blanking is in the enabled state, disable the PA blanking.

Optionally, the processing unit is further configured to, when the determining unit determines that the indication information is consistent with the current working mode of the PA blanking, perform no processing on the current working mode of the PA blanking.

For an operation process of the apparatus 40, refer to a processing process of the foregoing method for setting a working mode of PA blanking.

Embodiment 3

Figure 6:
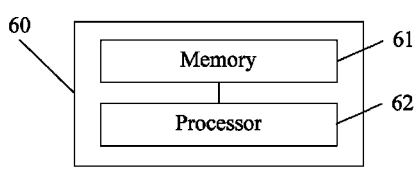
FIG. 6 is a structural diagram of an apparatus for setting a working mode of PA blanking according to Embodiment 3 of the present disclosure.

This embodiment of the present disclosure provides an apparatus 60 for setting a working mode of PA blanking. As shown in FIG. 6, the apparatus 60 includes a memory 61 and a processor 62.

The memory 61 is configured to store instructions and a preset table.

The processor 62 is configured to execute the instructions in the memory 61 to execute: when a GPS is running, detecting, at a preset interval, whether a GSM service is running; when it is detected that the GSM service is running, acquiring a current quantity of timeslots occupied by the GSM service and a current power control level used by the GSM service; searching, according to the current quantity of timeslots and the current power control level, a preset table for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state; determining whether the indication information is consistent with a current working mode of the PA blanking; and setting, when it is determined that the indication information is not consistent with the current working mode of the PA blanking, the current working mode of the PA blanking to a working mode corresponding to the indication information.

This embodiment of the present disclosure provides an apparatus for setting a working mode of PA blanking. When a GPS is running, it is detected, at a preset interval, whether a GSM service is running. When it is detected that the GSM service is running, a current quantity of timeslots occupied by the GSM service and a current power control level used by the GSM service are acquired. Then, a preset table is searched, according to the current quantity of timeslots and the current power control level, for indication information of a working mode of PA blanking corresponding to the current quantity of timeslots and the current power control level, where the preset table includes indication information of working modes of the PA blanking that correspond to different quantities of timeslots occupied by the GSM service and different power control levels used by the GSM service, and the indication information is used to indicate that the working mode of the PA blanking is in an enabled state or a disabled state. It is determined whether the indication information is consistent with the current working mode of the PA blanking. The current working mode of the PA blanking is set, when the indication information is not consistent with the current working mode of the PA blanking, to a working mode corresponding to the indication information. This embodiment of the present disclosure resolves a problem that, in the prior art, when a GSM is working, a PCL of a mobile phone and a quantity of slots both change, and because a PA blanking function cannot be configured flexibly to an enabled state or a disabled state, an amount of deterioration of a CN0 value of a GPS increases, and quality of a GPS receiving signal is degraded.

Optionally, the processor 62 is further configured to execute detecting, at the preset interval, whether a state value of the GSM service is a working state value.

Optionally, the processor 62 is further configured to execute: when it is detected that the GSM service is not running, detecting the current working mode of the PA blanking; and when it is detected that the current working mode of the PA blanking is in the enabled state, disabling the PA blanking.

Optionally, the processor 62 is further configured to execute: when the indication information indicates that the working mode of the PA blanking is in the enabled state and the current working mode of the PA blanking is in the disabled state, enabling the PA blanking; or when the indication information indicates that the working mode of the PA blanking is in the disabled state and the current working mode of the PA blanking is in the enabled state, disabling the PA blanking.

Optionally, the processor 62 is further configured to execute, when it is determined that the indication information is consistent with the current working mode of the PA blanking, performing no processing on the current working mode of the PA blanking.

The apparatus 60 is disposed in a terminal such as a mobile phone or a pad.

For an operation process of the apparatus 60, refer to a processing process of the foregoing method for setting a working mode of PA blanking.

It may be clearly understood by a person skilled in the art that, for the purpose of convenient and brief description, division of the foregoing functional modules is merely used as an example for description. In an actual application, the foregoing functions can be allocated to different functional modules and implemented according to a requirement, that is, the internal structure of the apparatus is divided into different functional modules to implement all or some of the functions described above. For a detailed working process of the foregoing system, apparatus, and unit, reference may be made to a corresponding process in the foregoing method embodiments, and details are not provided herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for setting a working mode of power amplifier (PA) blanking, comprising:
    detecting, at a preset interval, when a Global Positioning System (GPS) is running, whether a Global System for Mobile Communications (GSM) service is running;
    acquiring a current quantity of timeslots occupied by the GSM service and a current power control level used by the GSM service, when the GSM service is running;
    searching, according to the current quantity of timeslots and the current power control level, a preset table for indication information of the working mode of PA blanking corresponding to the current quantity of timeslots and the current power control level, wherein the preset table comprises indication information of working modes of the PA blanking that correspond to different quantities of timeslots occupied by the GSM service and different power control levels used by the GSM service, and wherein the indication information is used to indicate that the working mode of the PA blanking is in an enabled state or a disabled state;
    determining whether the indication information is consistent with a current working mode of the PA blanking;
    setting, when the indication information is not consistent with the current working mode of the PA blanking, the current working mode of the PA blanking to a working mode corresponding to the indication information;

enabling the PA blanking when the working mode of the PA blanking is in the enabled state and the current working mode of the PA blanking is in the disabled state; and disabling the PA blanking when the working mode of the PA blanking is in the disabled state and the current working mode of the PA blanking is in the enabled state.

2. The method for setting the working mode of PA blanking according to claim 1, wherein detecting, at the preset interval, whether the GSM service is running comprises detecting, at the preset interval, whether a state value of the GSM service is a working state value.

3. The method for setting the working mode of PA blanking according to claim 1, further comprising:

detecting the current working mode of the PA blanking, when the GSM service is not running; and disabling the PA blanking, when the current working mode of the PA blanking is in the enabled state.

4. The method for setting the working mode of PA blanking according to claim 3, further comprising maintaining the current working mode of the PA blanking on the current working mode of the PA blanking, when the indication information is consistent with the current working mode of the PA blanking.

5. An apparatus for setting a working mode of power amplifier (PA) blanking, comprising:

a memory; and a processor coupled to the memory and configured to:

detect, at a preset interval, whether a Global System for Mobile Communications (GSM) service is running when a Global Positioning System (GPS) is running;

acquire a current quantity of timeslots occupied by the GSM service and a current power control level used by the GSM service when the GSM service is running;

search, according to the current quantity of timeslots and the current power control level, a preset table for indication information of a working mode of PA blanking corresponding to the current quantity of timeslots and the current power control level, wherein the preset table comprises indication information of working modes of the PA blanking that correspond to different quantities of timeslots occupied by the GSM service and different power control levels used by the GSM service, and wherein the indication information is used to indicate that the working mode of the PA blanking is in an enabled state or a disabled state;

determine whether the indication information is consistent with a current working mode of the PA blanking;

set the current working mode of the PA blanking to a working mode corresponding to the indication information when the indication information is not consistent with the current working mode of the PA blanking;

enable the PA blanking when the working mode of the PA blanking is in the enabled state and the current working mode of the PA blanking is in the disabled state; and disable the PA blanking when the working mode of the PA blanking is in the disabled state and the current working mode of the PA blanking is in the enabled state.

6. The apparatus for setting the working mode of PA blanking according to claim 5, wherein the processor is configured to detect, at the preset interval, whether a state value of the GSM service is a working state value.

7. The apparatus for setting the working mode of PA blanking according to claim 5, wherein the processor is further configured to:

detect the current working mode of the PA blanking when the GSM service is not running; and disable the PA blanking when the processor detects that the current working mode of the PA blanking is in the enabled state.

8. The apparatus for setting the working mode of PA blanking according to claim 7, wherein the processor is further configured to perform no processing on the current working mode of the PA blanking when the processor determines that the indication information is consistent with the current working mode of the PA blanking.

* * * * *